United States Patent
Li et al.

(10) Patent No.: US 11,333,541 B2
(45) Date of Patent: May 17, 2022

(54) OIL TANK MEASUREMENT METHOD AND SYSTEM BASED ON LASER POINT CLOUD ANALYSIS

(71) Applicant: Zhoushan Institute of Calibration and Testing for Quality and Technology Supervision, Zhejiang (CN)

(72) Inventors: Cunjun Li, Zhejiang (CN); Huadong Hao, Zhejiang (CN); Xianlei Chen, Zhejiang (CN); Feiming Ren, Beijing (CN); Haolei Shi, Zhejiang (CN); Zenan Wu, Zhejiang (CN)

(73) Assignee: Zhoushan Institute of Calibration and Testing for Quality and Technology Supervision, Zhoushan (CN)

(*) Notice: Subject to any disclaimer, the term of this patent is extended or adjusted under 35 U.S.C. 154(b) by 317 days.

(21) Appl. No.: 16/567,154

(22) Filed: Sep. 11, 2019

(65) Prior Publication Data

US 2020/0292368 A1    Sep. 17, 2020

(30) Foreign Application Priority Data

Mar. 11, 2019    (CN) .......................... 201910178680.9

(51) Int. Cl.
  *G01F 17/00*    (2006.01)
  *G01S 17/89*    (2020.01)
  *G01S 7/48*    (2006.01)

(52) U.S. Cl.
  CPC ............ *G01F 17/00* (2013.01); *G01S 7/4808* (2013.01); *G01S 17/89* (2013.01)

(58) Field of Classification Search
  CPC ................................ G01F 17/00; G01S 17/89

USPC .......................................................... 702/55
See application file for complete search history.

(56) References Cited

FOREIGN PATENT DOCUMENTS

| CN | 101219766 A |   | 7/2008 |
|----|-------------|---|--------|
| CN | 102811229 A |   | 12/2012 |
| CN | 105469404   | * | 4/2016 |
| CN | 205187006 U |   | 4/2016 |
| CN | 102980531   | * | 3/2017 |

(Continued)

OTHER PUBLICATIONS

Yong-Jin Liu, Cylindr Detection in large-scale point cloud of pipeline plant, Oct. 2013 (Year: 2013).*

(Continued)

*Primary Examiner* — Michael P Nghiem
*Assistant Examiner* — Dacthang P Ngo

(57) ABSTRACT

The invention provides an oil tank measurement method and system based on laser point cloud analysis, comprising: acquiring point cloud data inside an oil tank, which is collected by a laser measurement device; separating point cloud data of a main body of the oil tank from point cloud data of a plug, to acquire the point cloud data of the main body of the oil tank; calculating, based on Gauss mapping, an axis for the point cloud data of the main body of the oil tank; determining any one first plane perpendicular to the axis, and projecting a point cloud of the main body onto the first plane to obtain a point cloud of a projected cross-section of the tank body on the first plane; multi-segment fitting the point cloud of the projected cross-section of the tank body; and calculating a volume according to a result of multi-segment fitting.

7 Claims, 3 Drawing Sheets

(56) References Cited

FOREIGN PATENT DOCUMENTS

| CN | 106949942 A | 7/2017 |
| CN | 107782420 A | 3/2018 |

OTHER PUBLICATIONS

CN 102980531—English Translation (Year: 2013).*
CN 105469404—English Translation (Year: 2016).*
Nuvanut, Illustration homeowner guide to heating oil tank, 2011 (Year: 2011).*
Hao Huadong, The automatic measurement system of large vertical storage tank volume based on 3D laser scanning pricipale, 2017 (Year: 2017).*

* cited by examiner

OIL TANK MEASUREMENT METHOD AND SYSTEM BASED ON LASER POINT CLOUD ANALYSIS

CROSS-REFERENCE TO RELATED APPLICATIONS

This application claims the benefit of priority from Chinese Patent Application No. 201910178680.9, filed on Mar. 11, 2019. The content of the aforementioned application, including any intervening amendments thereto, is incorporated herein by reference in its entirety.

TECHNICAL FIELD

The present invention relates to the technical field of measurement and in particular to an oil tank measurement method and system based on laser point cloud analysis.

BACKGROUND OF THE PRESENT INVENTION

With the development of science and technology and the advancement of measurement technology, people have higher requirements for the scientific and accurate measurement of petroleum products in the process of production, sale and use. Such requirements become higher, especially with the increasing price of petroleum products. There is an urgent need to upgrade the existing technology to ensure the fair, just and accurate transfer of petroleum products between both sides of the trade.

As a special vehicle for road transportation of light fuel oil, a tank car is also a national compulsory verification measuring instrument for petroleum product transfer and trade settlement. A tank car usually consists of three parts: the tank body mounted on the car, the car body and the auxiliary equipment. There are manholes, metering ports, etc., on the top of the tank body, and oil discharge pipes, valves, etc., on the sides thereof. The accuracy of the oil tank volume measurement of the tank car directly affects the economic interests of petroleum product storage and transportation enterprises and the measurement reputation of a country. It is imperative to establish an innovative fast, accurate and reliable measurement system.

It is stipulated in the national metrological verification regulation JJG133-2016 "Tank Car Capacity" that the metrological performance should satisfy the following condition: the expanded uncertainty of the capacity measurement result should not be greater than 0.25% (k=2). The volume measurement of tank cars is mainly performed by volume comparison or by using a flowmeter. The arbitral verification is subject to capacity comparison. When the volume measurement of a tank car is performed by capacity comparison, by a set of grade-II metal measuring instruments (MPE: $\pm 2.5 \times 10^{-4}$) as standard instruments, such as 2000L, 1000L, 500L, 200L, 100L, 50L, etc., petroleum products are injected into the tank car from the grade-II metal measuring instruments with a known standard capacity (may be used in combination). The volume value is obtained according to the injected standard value. Meanwhile, the water temperature and liquid level (or space height) inside the metal measuring instruments and the tank are measured, to calculate a relation between the volume and the liquid level. It may take 5 hours to verify a 20t tank car by manual drainage and reading, which is both time and labor consuming and error prone. When the volume measurement of a tank car is performed by using a flowmeter, high requirements are proposed on the flowmeter. It is necessary to use a highly reproducible flowmeter and select a highly reproducible flow point. By using the flowmeter at a fixed point and controlling the time, the purpose of volume measurement can be realized.

Although many experts and scholars both in China and abroad have carried out a lot of research on the volume measurement of tank cars, these methods only improve the degree of automation, and there are still many shortcomings. For example, the verification is costly, and requires a lot of manpower and material resources and a certain amount of water. Moreover, it needs to place standard measuring instruments on a fixed site. The complicated operation leads to limited practicality, and it is difficult to guarantee the accuracy of verification. This is also inconsistent with the existing booming high technology.

SUMMARY OF THE PRESENT INVENTION

A technical problem to be solved in the present invention is to overcome the shortcomings of the volume measurement of tank cars, for example, the verification is costly, and requires a lot of manpower and material resources and a certain amount of water; it needs to place standard measuring instruments on a fixed site; the operation is complicated; and it is difficult to guarantee the accuracy of verification.

The oil tank measurement method based on laser point cloud analysis comprises steps of:

acquiring point cloud data inside an oil tank, which is collected by a laser measurement device;

separating point cloud data of a main body of the oil tank from point cloud data of a plug, to acquire the point cloud data of the main body of the oil tank;

calculating, based on Gauss mapping, an axis for the point cloud data of the main body of the oil tank;

determining any one first plane perpendicular to the axis, and projecting a point cloud of the main body onto the first plane to obtain a point cloud of a projected cross-section of the tank body on the first plane;

multi-segment fitting the point cloud of the projected cross-section of the tank body; and calculating a volume according to a result of multi-segment fitting.

Further, calculating, based on Gauss mapping, an axis for the point cloud data of the main body of the oil tank specifically comprises:

S21: calculating a unit normal vector for each point in the point cloud of the main body, translating a starting point of a normal vector to the origin of coordinates and forming a unit sphere by an ending point of the normal vector;

S22: plane fitting ending points of all normal vectors to obtain a plane $\Phi 1$;

S23: calculating a distance di (i=1,2, . . . n) from the ending point of each normal vector to the plane $\Phi 1$;

S24: setting a threshold $\omega 1$, deleting normal vectors over a threshold $\omega 1$ distance if di>$\omega 1$, and fitting ending points of the remaining normal vectors again to obtain a plane $\Phi 2$;

S25: calculating a distance di' from the ending points of all the remaining normal vectors to the plane $\Phi 2$, and returning to the step S24 until the distance from the ending points of all the remaining normal vectors to the plane is less than $\omega 1$, wherein a fit plane $\Phi j$ is obtained which has a unit normal vector nj; and S26: selecting one plane perpendicular to the unit normal vector nj, projecting the point cloud of the main body onto the plane, and fitting the obtained circle center, wherein the axis passes through the circle center and is in a same direction as the unit normal vector nj.

Further, multi-segment fitting the point cloud of the projected cross-section of the tank body is specifically as follows:

uniformly dividing, by centering the axis and at a certain angle, the point cloud of the projected cross-section of the tank body into 4N segments, N=1,2,3 . . . ; and fitting each segment of the point cloud of the projected cross-section of the tank body, respectively.

Further, for the fitting of the point cloud of the projected cross-section of the tank body, quadratic curve fitting is used.

Further, calculating a volume according to a result of multi-segment fitting specifically comprises:

acquiring auxiliary calculation data measured in advance, wherein the auxiliary calculation data comprises the length of the main body of the oil tank and the height of the plug; and calculating the volume according to the result of multi-segment fitting and the auxiliary calculation data.

Further, the oil tank measurement method based on laser point cloud analysis further comprises a step of:

acquiring a unit distance in a length direction, and containing the volume per unit distance in the volume calculation result.

Further, the oil tank measurement method based on laser point cloud analysis further comprises a step of:

outputting a measurement result, wherein the measurement result comprises submitter, name of measuring instrument, model/specification, tank No., manufacturer, verification/calibration basis, conclusion, date, volume per unit distance, horizontal diameter, vertical diameter, length of the tank body, external height, approximate cylindrical volume, plug volume, and total volume.

Further, the measurement result is output in Excel format.

In another aspect, the present invention further provides an oil tank measurement system based on laser point cloud analysis, comprising:

an acquisition module, configured to acquire point cloud data inside an oil tank, which is collected by a laser measurement device;

a separation module, configured to separate point cloud data of a main body of the oil tank from point cloud data of a plug, to acquire the point cloud data of the main body of the oil tank;

an axis calculation module, configured to calculate, based on Gauss mapping, an axis for the point cloud data of the main body of the oil tank;

a projection module, configured to determine any one first plane perpendicular to the axis, and project a point cloud of the main body onto the first plane to obtain a point cloud of a projected cross-section of the tank body on the first plane;

a fitting module, configured to multi-segment fit the point cloud of the projected cross-section of the tank body; and a volume calculation module, configured to calculate a volume according to a result of multi-segment fitting.

The present invention provides an oil tank measurement method based on laser point cloud analysis. In the oil tank measurement method, the volume of the oil tank is calculated by acquiring point cloud data inside an oil tank, which is collected by a laser measurement device, and processing the point cloud data inside the oil tank. Therefore, the oil tank measurement method of the present invention has the following beneficial effects: no water consumption is caused, the measurement efficiency is high, and there is no need for the operators to implement measurement inside the tank; manpower required for measurement is reduced; and measurement devices may be used in oil and gas environments, and the safety of measurement operators is ensured.

DETAILED DESCRIPTION OF THE PRESENT INVENTION

The technical solutions of the present invention will be further described with reference to the accompanying drawings by specific embodiments of the present invention. However, the present invention is not limited to those embodiments.

At present, the capacity measurement of oil tanks has disadvantages of low measurement speed, high labor intensity, low degree of automation, waste of water, and lack of energy saving awareness. To solve those problems, the present invention provides an oil tank measurement method based on laser point cloud analysis.

The oil tank measurement method based on laser point cloud analysis in an embodiment of the present invention will be further explained and described with reference to the accompanying drawings.

Figure 1:
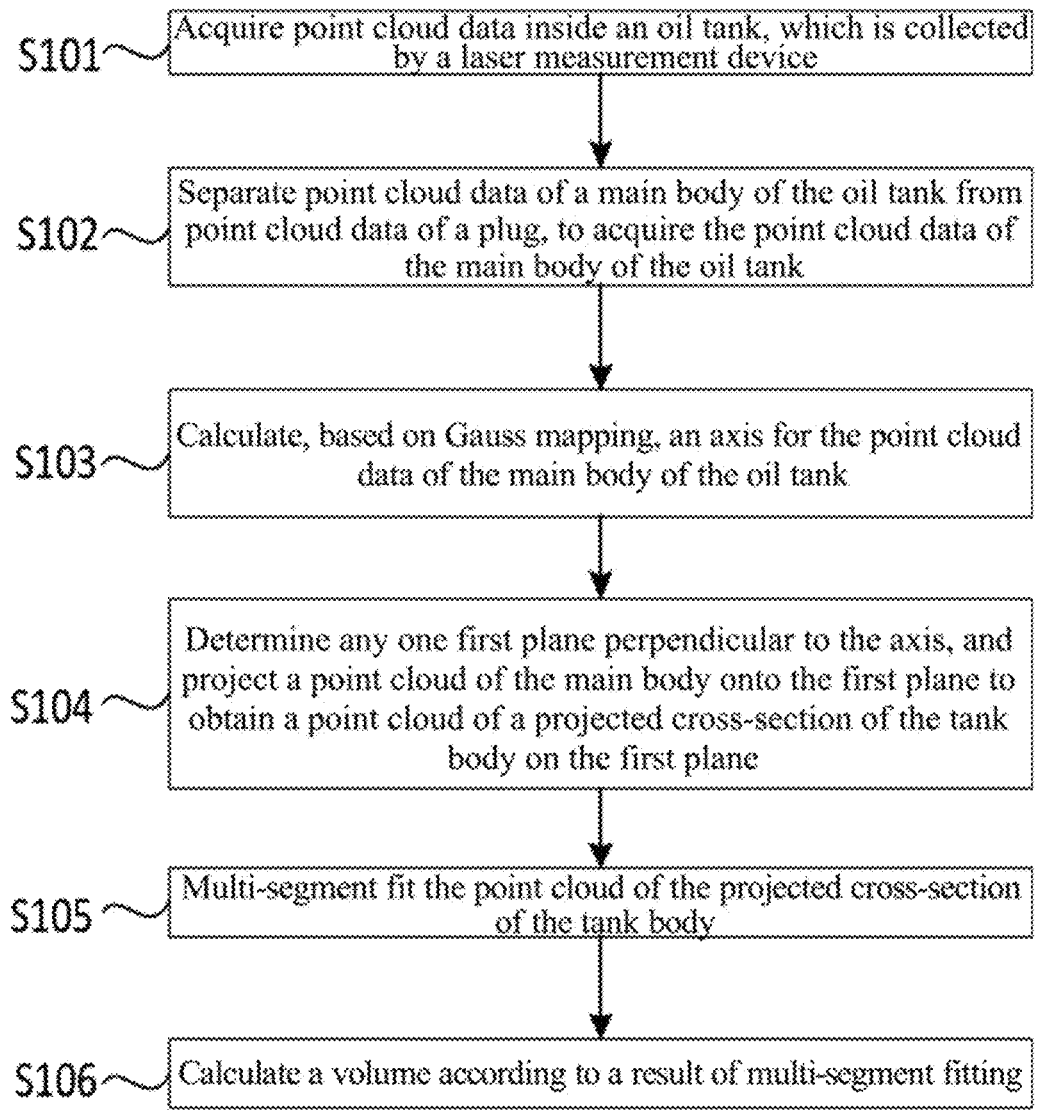
FIG. 1 is a flowchart of an oil tank measurement method based on laser point cloud analysis in an exemplary embodiment.

FIG. 1 is a flowchart of an oil tank measurement method based on laser point cloud analysis in an exemplary embodiment. As shown in FIG. 1, the oil tank measurement method based on laser point cloud analysis comprises steps S101 to S106.

S101: Point cloud data inside an oil tank, which is collected by a laser measurement device, is acquired.

The collected data information includes size information inside the oil tank, washboard and guide tubes.

The process of data collection by the laser measurement device is as follows: the laser measurement device is hung upside down at the opening of the oil tank and well fixed, and then the leveling bubble is adjusted to the middle position. Then, measurement parameter data for inclination and rotation, for example, measurement speed, measurement interval, the number of measurement steps, upper and lower limits, starting point of measurement, are set in the control system. Then, the measurement is started. At the end of measurement, the data is uploaded to a computer.

In the computer, the collected data may be overall viewed by man-machine interaction to obtain the distribution of noise point clouds and stray points. The noise point clouds may be selected, abandoned, deleted and hidden by a rectangular box. And, the washboard inside the tank body and the stray points may be eliminated.

S101 may further comprise checking the integrity of the point cloud data, in which the point cloud data is rotated up and down, left and right, and horizontally, to check the integrity of the collected point cloud data information of the oil tank.

It is to be noted that, by the laser measurement device, the oil tank may be scanned at 360°, and the scanned image of the inside of the tank body is clear, which is convenient for the user to view.

S102: Point cloud data of a main body of the oil tank is separated from point cloud data of a plug, to acquire the point cloud data of the main body of the oil tank.

S103: Based on Gauss mapping, an axis is calculated for the point cloud data of the main body of the oil tank.

Specifically, the step S103 comprises:

S21: calculating a unit normal vector for each point in the point cloud of the main body, translating a starting point of a normal vector to the origin of coordinates and forming a unit sphere by an ending point of the normal vector;

S22: plane fitting ending points of all normal vectors to obtain a plane $\Phi1$;

S23: calculating a distance di (i=1,2, . . . n) from the ending point of each normal vector to the plane $\Phi1$;

S24: setting a threshold $\omega1$, deleting normal vectors over a threshold $\omega1$ distance if di>$\omega1$, and fitting ending points of the remaining normal vectors again to obtain a plane $\Phi2$;

S25: calculating a distance di' from the ending points of all the remaining normal vectors to the plane $\Phi2$, and returning to the step S24 until the distance from the ending points of all the remaining normal vectors to the plane is less than $\omega1$, wherein a fit plane $\Phi j$ is obtained which has a unit normal vector nj; and S26: selecting one plane perpendicular to the unit normal vector nj, projecting the point cloud of the main body onto the plane, and fitting the obtained circle center, wherein the axis passes through the circle center and is in a same direction as the unit normal vector nj.

First, a unit normal vector is calculated for each point in the point cloud of the main body, a starting point of a normal vector is translated to the origin of coordinates and a unit sphere is formed by an ending point of the normal vector; ending points of all normal vectors are plane fit to obtain a plane $\Phi1$; normal vectors over a threshold $\omega1$ distance are deleted; ending points of the remaining normal vectors are fit again to obtain a plane $\Phi2$; normal vectors over the threshold $\omega1$ distance are deleted again based on the newly generated plane $\Phi2$, and the new plane is then fit; the above process is repeated until the distance from the ending points of all the remaining normal vectors to the plane is less than $\omega1$, wherein a fit plane $\Phi j$ is obtained which has a unit normal vector nj; one plane perpendicular to the unit normal vector nj is selected, the point cloud of the main body is projected onto the plane, and the obtained circle center is fit, wherein the axis passes through the circle center and is in a same direction as the unit normal vector nj.

S104: Any one first plane perpendicular to the axis is determined, and a point cloud of the main body is projected onto the first plane to obtain a point cloud of a projected cross-section of the tank body on the first plane.

S105: The point cloud of the projected cross-section of the tank body is multi-segment fit.

Specifically, multi-segment fitting the point cloud of the projected cross-section of the tank body is specifically as follows:

uniformly dividing, by centering the axis and at a certain angle, the point cloud of the projected cross-section of the tank body into 4N segments, N=1,2,3 . . . ; and fitting each segment of the point cloud of the projected cross-section of the tank body, respectively.

Further, for the fitting of the point cloud of the projected cross-section of the tank body, quadratic curve fitting is used.

Figure 2:
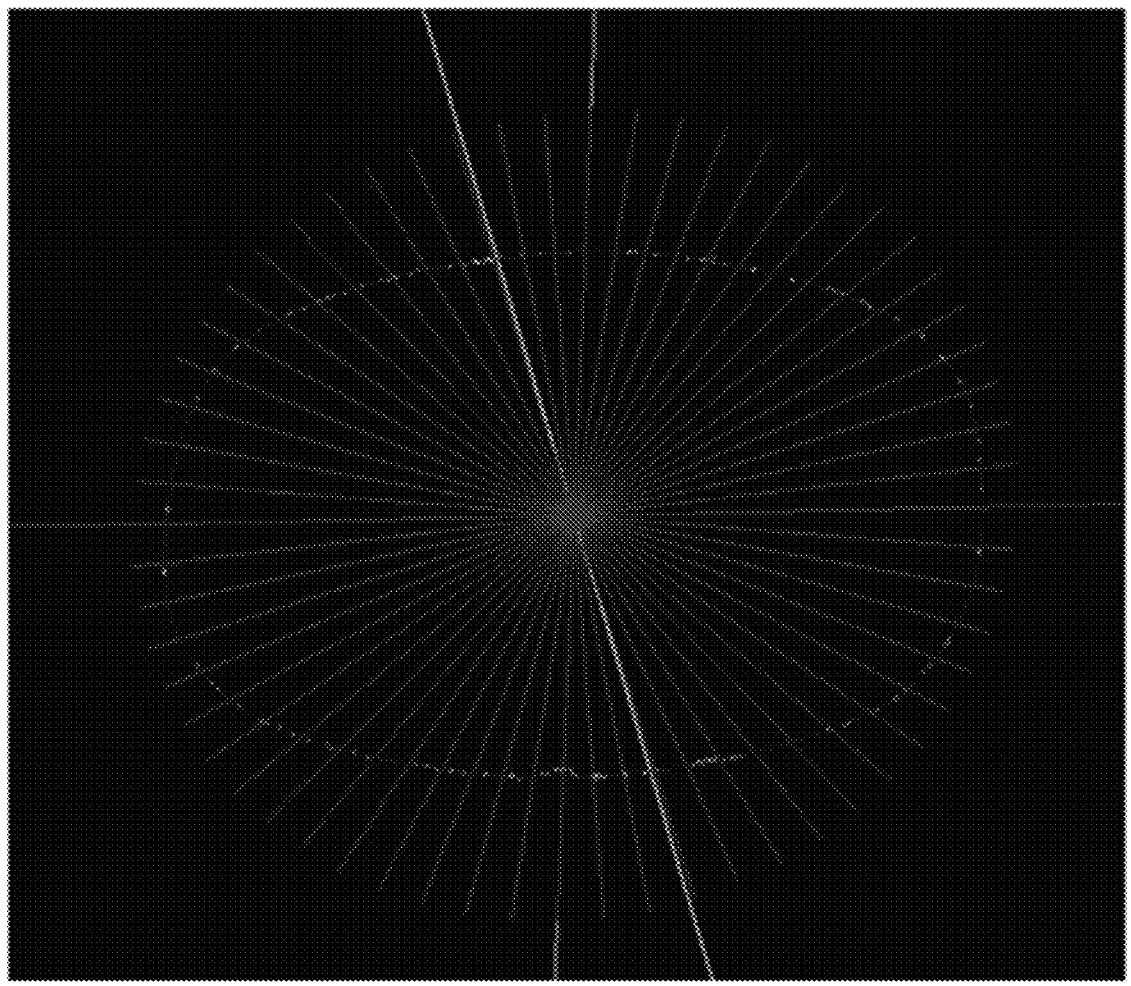
FIG. 2 is a segmented view of the point cloud of the projected cross-section of the tank body in an exemplary embodiment.

Specifically, since it is difficult to perform overall fitting because the projected cross-section of the tank body is irregular, segmented fitting is used. The point cloud of the cross-section is uniformly divided, at a certain angle, into 4N segments, N=1,2,3 . . . . Then, each segment of the point cloud is fit, respectively. There are many ways of fitting, for example, quadratic curve fitting, spline curve fitting, etc. In addition, in consideration of the accuracy of fitting, quadratic curve fitting is used. If the amount of data is sufficient, a greater number of segments to be fit results in a fit curve that is closer to the reality and thus a higher accuracy of fitting. FIG. 2 is a segmented view of the point cloud of the projected cross-section of the tank body in an exemplary embodiment.

S106: A volume is calculated according to a result of multi-segment fitting.

Specifically, first, the cross-sectional area is calculated according to the result of multi-segment fitting, and the capacity of the oil tank is calculated in combination with the data in the length direction.

Further, calculating a volume according to a result of multi-segment fitting specifically comprises:

acquiring auxiliary calculation data measured in advance, wherein the auxiliary calculation data comprises the length of the main body of the oil tank and the height of the plug; and calculating the volume according to the result of multi-segment fitting and the auxiliary calculation data.

Specifically, the auxiliary calculation data measured in advance is entered in the system, for example, the length of the main body of the oil tank, the height of the plug and the external height. Such data provides basic information support for the calculation of the horizontal and vertical diameters of the tank body and the volume of each part.

Further, the oil tank measurement method based on laser point cloud analysis further comprises a step of: acquiring a unit distance in a length direction, and containing the volume per unit distance in the volume calculation result.

Specifically, the calculation spacing is defined. It may be input by an operating interface. Usually, 1 mm or 10 mm may be input, which denote a millimeter volume table or a centimeter volume table in the output template, respectively.

Further, the oil tank measurement method based on laser point cloud analysis further comprises a step of:

outputting a measurement result, wherein the measurement result comprises submitter, name of measuring instrument, model/specification, tank No., manufacturer, verification/calibration basis, conclusion, date, volume per unit distance, horizontal diameter, vertical diameter, length of the tank body, external height, approximate cylindrical volume, plug volume, and total volume.

It is to be noted that the content contained in the measurement result is not limited thereto and may be adjusted according to actual situations.

Further, the measurement result is output in Excel format.

Compared with the prior art, the oil tank measurement method in this embodiment causes no water consumption; by the automatic measurement, the verification efficiency is improved significantly when compared with the conventional methods, and the shutdown time of enterprises is reduced; there is no need for the operators to implement measurement inside the tank, no standard metal measuring instruments are required, and the measurement may be realized outside the oil tank, so the labor intensity is decreased greatly; and the used laser measurement device is of an intrinsically safe explosion-proof design, so it may be used in oil and gas environments, and the safety of operators is ensured.

Figure 3:
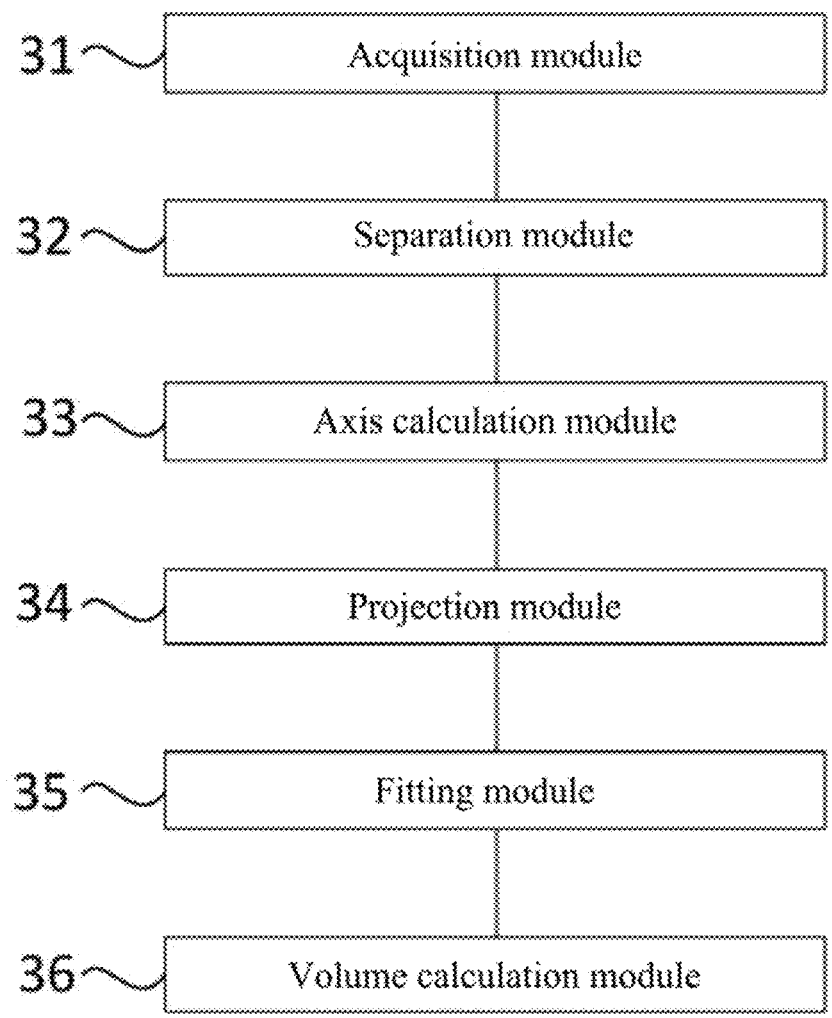
FIG. 3 is a schematic block diagram of an oil tank measurement system based on laser point cloud analysis in an exemplary embodiment.

FIG. 3 is a schematic block diagram of an oil tank measurement system based on laser point cloud analysis in an exemplary embodiment. The oil tank measurement system based on laser point cloud analysis comprises:

an acquisition module 31, configured to acquire point cloud data inside an oil tank, which is collected by a laser measurement device;

a separation module 32, configured to separate point cloud data of a main body of the oil tank from point cloud data of a plug, to acquire the point cloud data of the main body of the oil tank;

an axis calculation module 33, configured to calculate, based on Gauss mapping, an axis for the point cloud data of the main body of the oil tank;

a projection module 34, configured to determine any one first plane perpendicular to the axis, and project a point cloud of the main body onto the first plane to obtain a point cloud of a projected cross-section of the tank body on the first plane;

a fitting module 35, configured to multi-segment fit the point cloud of the projected cross-section of the tank body; and a volume calculation module 36, configured to calculate a volume according to a result of multi-segment fitting.

The oil tank measurement system based on laser point cloud analysis in this embodiment corresponds to the oil tank measurement method based on laser point cloud analysis shown in FIG. 1. The detailed description of the system may refer to the description of the embodiment of the method and will not be repeated here.

The specific embodiments described herein are merely examples of the spirit of the present invention. Those skilled in the art may make various modifications or supplements or replacements in a similar way of the described specific embodiments without departing from the spirit of the present invention or beyond the scope defined by the appended claims.

What is claimed is:

1. An oil tank measurement method based on laser point cloud analysis, comprising steps of:
   positioning a laser measurement device at an opening of an oil tank;
   scanning the oil tank to acquire point cloud data inside the oil tank using the laser measurement device and displaying a scanned image of an inside of the oil tank;
   separating point cloud data of a main body of the oil tank from point cloud data of a plug, to acquire the point cloud data of the main body of the oil tank;
   calculating, based on Gauss mapping, an axis for the point cloud data of the main body of the oil tank by:
   a) calculating a unit normal vector for each point in the point cloud data of the main body, translating a starting point of a normal vector to the origin of coordinates and forming a unit sphere by an ending point of the normal vector;
   b) plane fitting ending points of all normal vectors to obtain a plane $\Phi 1$;
   c) calculating a distance di (i=1,2, . . . n) from the ending point of each normal vector to the plane $\Phi 1$;
   d) setting a threshold $\omega 1$, deleting the normal vectors over a threshold $\omega 1$ distance if di>$\omega 1$, and fitting ending points of the remaining normal vectors again to obtain a plane $\Phi 2$;
   e) calculating a distance di' from the ending points of all the remaining normal vectors to the plane $\Phi 2$, and returning to the step d) until the distance from the ending points of all the remaining normal vectors to the plane is less than $\omega 1$ wherein a fit plane $\Phi j$ is obtained which has a unit normal vector nj; and
   f) selecting one plane perpendicular to the unit normal vector nj, projecting the point cloud data of the main body onto the plane, and fitting the obtained circle center, wherein the axis passes through the circle center and is in a same direction as the unit normal vector nj;
   determining any one first plane perpendicular to the axis, and projecting the point cloud data of the main body onto the first plane to obtain a point cloud of a projected cross-section of the tank body on the first plane;
   multi-segment fitting the point cloud of the projected cross-section of the tank body; and
   calculating a volume according to a result of multi-segment fitting.

2. The oil tank measurement method based on the laser point cloud analysis according to claim 1, wherein multi-segment fitting the point cloud of the projected cross-section of the tank body is specifically as follows:
   uniformly dividing, by centering the axis and at a certain angle, the point cloud of the projected cross-section of the tank body into 4N segments, N=1,2,3 . . . ; and
   fitting each segment of the point cloud of the projected cross-section of the tank body, respectively.

3. The oil tank measurement method based on the laser point cloud analysis according to claim 2, wherein, for the fitting of the point cloud of the projected cross-section of the tank body, quadratic curve fitting is used.

4. The oil tank measurement method based on the laser point cloud analysis according to claim 1, wherein calculating a volume according to a result of multi-segment fitting specifically comprises:
   acquiring auxiliary calculation data measured in advance, wherein the auxiliary calculation data comprises the length of the main body of the oil tank and the height of the plug; and
   calculating the volume according to the result of multi-segment fitting and the auxiliary calculation data.

5. The oil tank measurement method based on the laser point cloud analysis according to claim 1, further comprising a step of:
   acquiring a unit distance in a length direction, and containing the volume per unit distance in the volume calculation result.

6. The oil tank measurement method based on the laser point cloud analysis according to claim 5, further comprising a step of:
   outputting a measurement result, wherein the measurement result comprises submitter, name of measuring instrument, model/specification, tank No., manufacturer, verification/calibration basis, conclusion, date, volume per unit distance, horizontal diameter, vertical diameter, length of the tank body, external height, approximate cylindrical volume, plug volume, and total volume.

7. The oil tank measurement method based on the laser point cloud analysis according to claim 6, wherein the measurement result is output in Excel format.

* * * * *